Feb. 11, 1969   J. P. MASSEY   3,426,922
ORDER PICKING MECHANISM
Filed April 7, 1967   Sheet 2 of 5
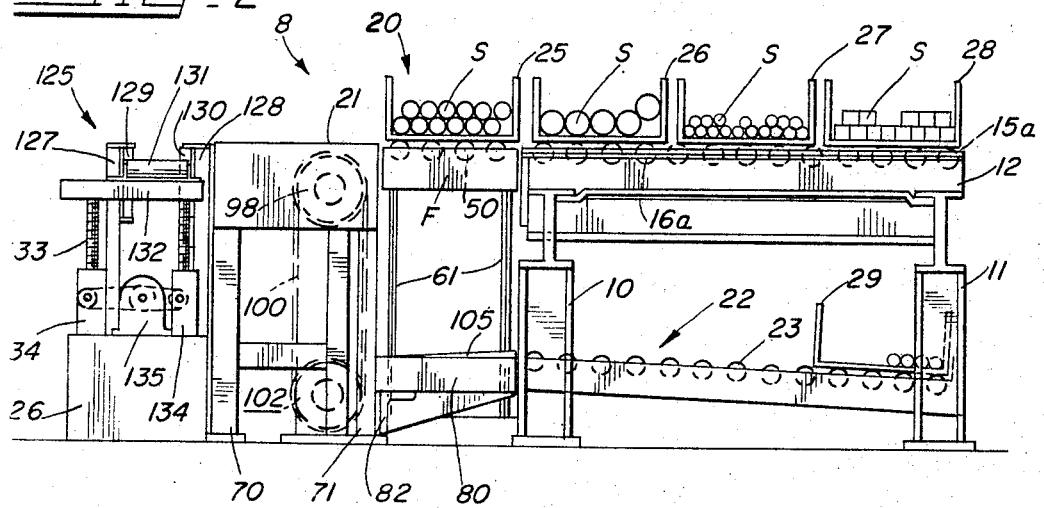
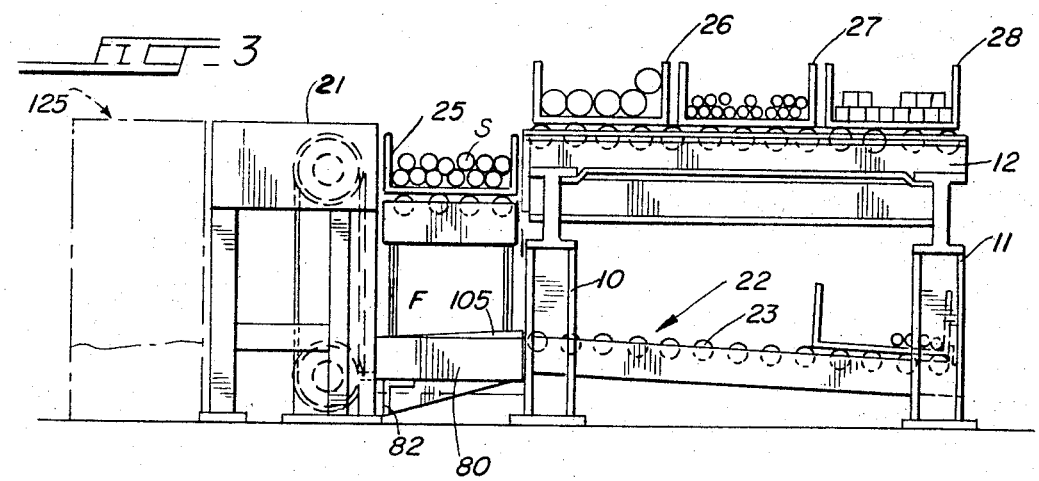
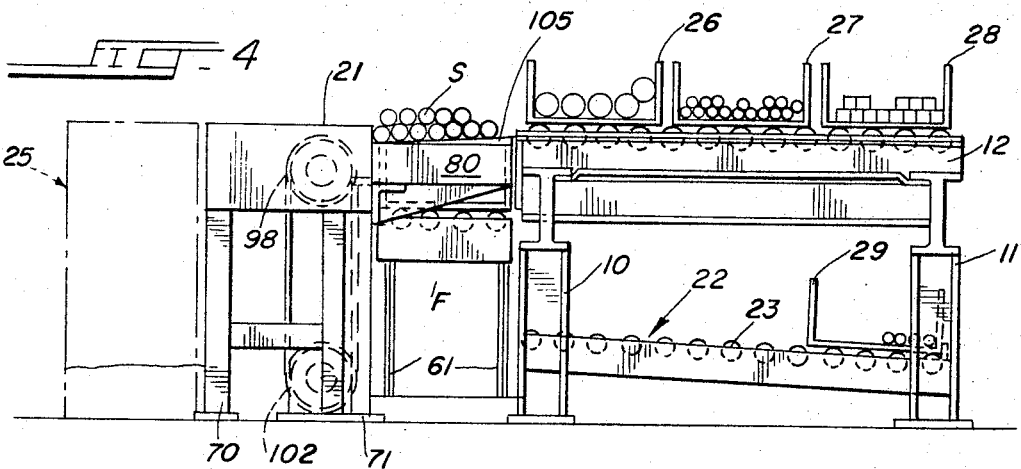

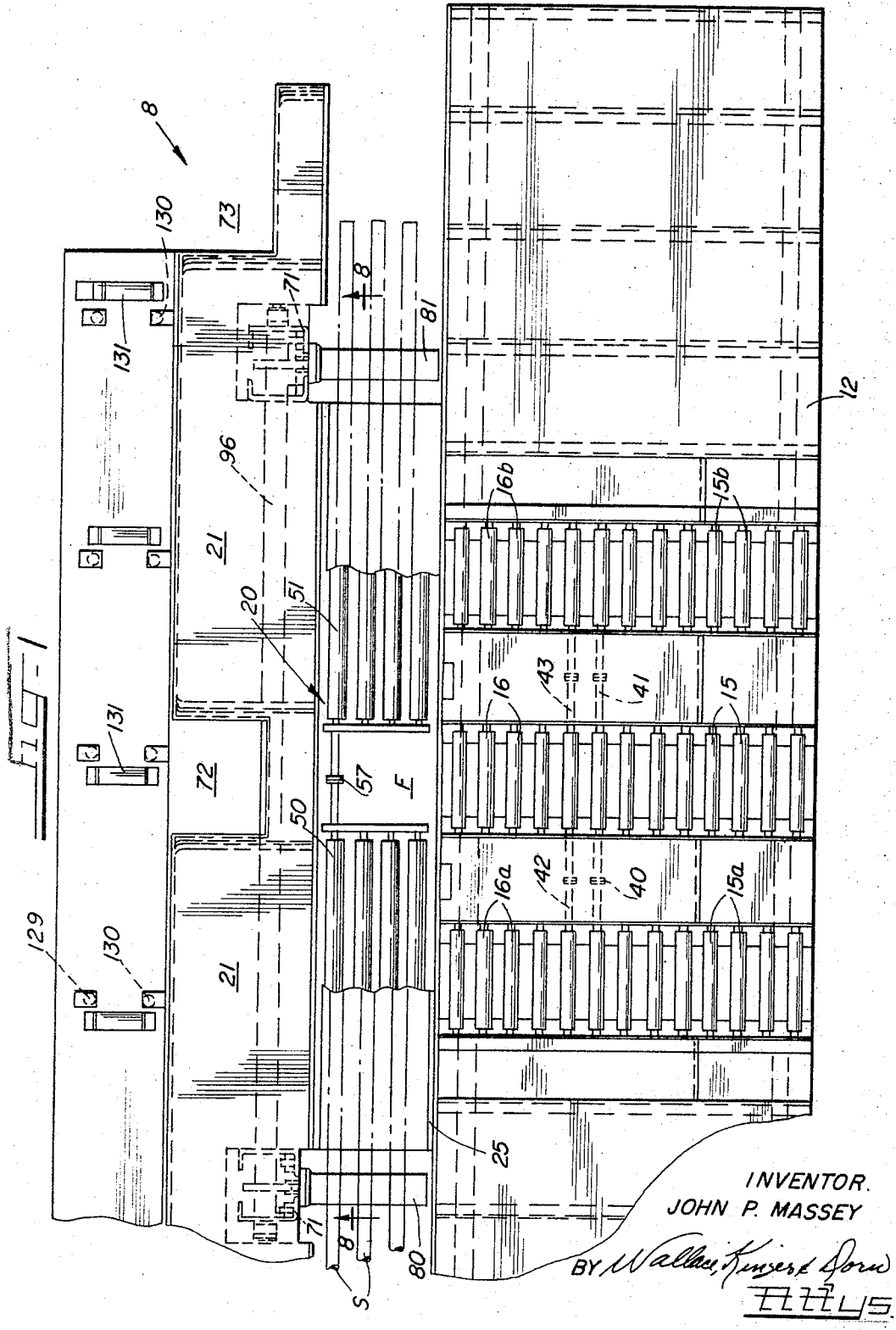

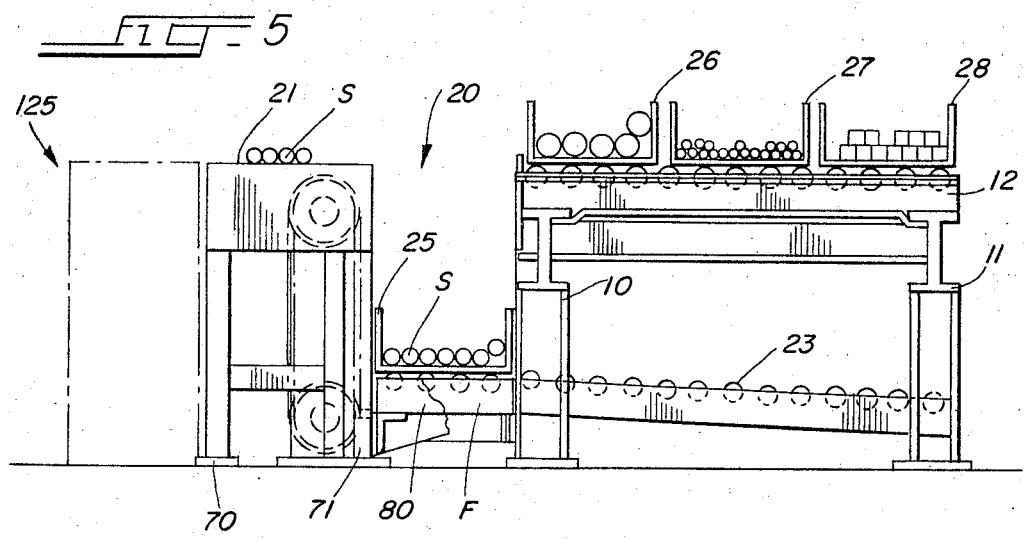
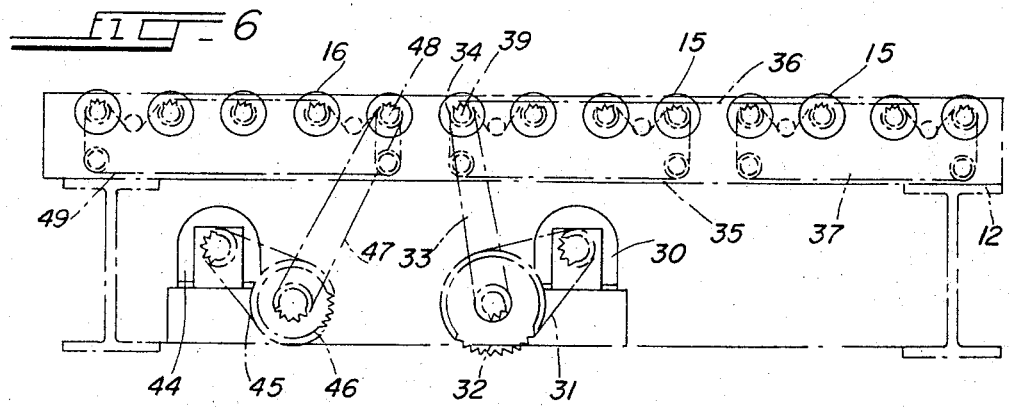
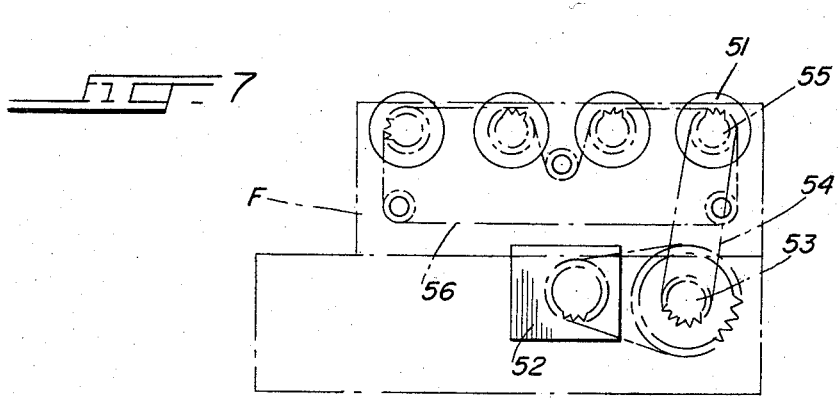

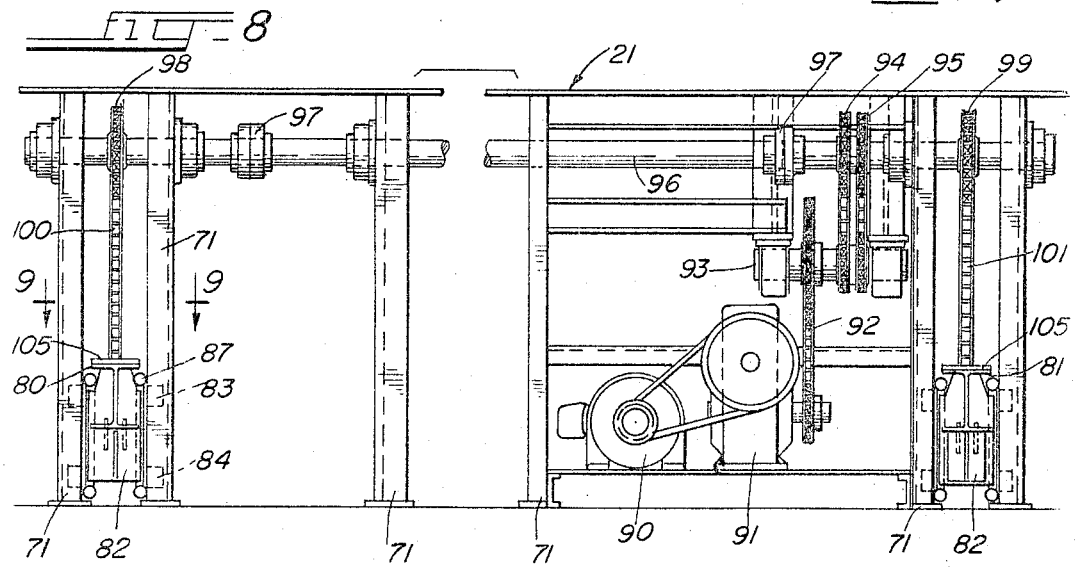

Feb. 11, 1969    J. P. MASSEY    3,426,922
ORDER PICKING MECHANISM
Filed April 7, 1967    Sheet 5 of 5

United States Patent Office 3,426,922
Patented Feb. 11, 1969

3,426,922
ORDER PICKING MECHANISM
John P. Massey, Clarendon Hills, Ill., assignor to Dormont Allen Company Inc., Cicero, Ill., a corporation of Illinois
Filed Apr. 7, 1967, Ser. No. 629,200
U.S. Cl. 214—2            7 Claims
Int. Cl. B65g 69/00, 65/04

ABSTRACT OF THE DISCLOSURE

An order picking mechanism for selection of stock orders from different sizes of steel bars, tubes, or rods, or other large or heavy stock, stored in trays by size or other characteristics. The trays are successively advanced to a tray unloading station by a series of independent conveyor units, the last conveyor unit being mounted on an elevator at the unloading station. The stock in each tray is lifted above the edge of the tray while located in the unloading station, permitting the operator to unload any desired stock quantity onto an adjacent table; lifting is effected by a pair of stripper arms moving upwardly to engage the stock just beyond the ends of an open-end tray or moving through apertures near the ends in the bottom of a closed-end tray. After unloading, the stripper arms are retracted, the elevator is lowered, and the tray is deposited on a discharge conveyor that removes the tray. The elevator is then returned to its original level ready for the next tray. A weighing mechanism is located at the unloading station.

Field of the invention

This invention relates to article handling equipment and, more particularly, to an order picking mechanism for stock, such as steel bars, tubes or rods, and other large or heavy stock items, to facilitate picking the proper stock pieces for filling of an order.

The prior art

Products such as rods, tubes, bars and other similar items of substantial length, either of metal or other material, are often warehoused in trays or like containers. When an order for certain stock is to be filled, the container or containers for that stock are delivered to a station where the stock on order is removed from the containers. With items of substantial size or weight, it is often difficult for an operator or operators to remove the desired stock from the containers. This is particularly true with long bars, rods, tubes and the like, which can be heavy and very awkward to handle, whether handled manually or with power hoists and similar equipment.

Summary of the invention

The order picking mechanism of the present invention provides a new and improved apparatus, particularly suitable for warehousing operations, for facilitating removal of stock material from trays in the filling of an order by an operator. The order picking mechanism comprises a tray unloading station including an elevator and means for moving the elevator between first and second levels. First conveyor means are provided, aligned with the first level for the elevator, for advancing stock trays, in succession, to deposit the trays on the elevator while the elevator is at its first level. Retractable lifting means are located at the unloading station; the lifting means lift the stock from a tray positioned on the elevator, while the elevator remains at its first level, above the sides of the tray. This enables the operator to remove one or more pieces of stock from the tray without reaching into the tray. The mechanism further includes a second conveyor means that is aligned with the second level of the elevator and that is utilized to transport trays away from the unloading station when the lifting means has been retracted and the elevator has been moved to its second level.

In the preferred embodiments of the invention, there is one conveyor unit that is common to both the first and second conveyor means, being located on the elevator itself. This construction makes it possible to assure complete advancement of each tray onto the elevator for unloading and to discharge each tray to the second conveyor without the necessity of affording two separate mechanisms for this conveyor operation. The retractable lifting means preferably comprises a pair of stripper arms located to engage the stock near the ends of the trays; with open-ended trays, the stripper arms may be positioned immediately beyond the ends of the trays and with closed-end trays the stripper arms are aligned with apertures in the tray bottoms near the tray ends. And appropriate control for the stripper arms makes it possible to lift the stock from the trays to varying levels, compensating for variations in the quantity of stock in each tray. Another feature of the invention is the provision of stock weighing means incorporated in a table immediately adjacent the unloading station to provide for immediate weighing of the stock pieces as they are added to the order.

Further objects and advantages will become apparent from the following detailed description taken in connection with the accompanying drawings.

Description of the drawings

FIG. 1 is a plan view of an order picking mechanism, including a stock tray, constructed in accordance with one embodiment of the invention, with some parts broken away to facilitate the illustration thereof;

FIG. 2 is an end elevation of the mechanism shown in FIG. 1;

FIG. 3 is an elevation view, similar to FIG. 2, showing the mechanism in a subsequent position;

FIG. 4 is an elevation view, similar to FIG. 3, showing the mechanism in a further advanced position in a cycle of operation;

FIG. 5 is an elevation view, similar to FIG. 4, showing the mechanism positioned further in the cycle of operation;

FIG. 6 is a schematic vertical central section view of the drive for the tray advancing conveyor means;

FIG. 7 is a schematic view of the conveyor mechanism associated with the tray elevator;

FIG. 8 is a vertical section, taken generally along the line 8—8 in FIG. 1, with parts broken away, showing the actuating mechanism for the stripper arms and omitting the elevator;

FIG. 9 is a section view, on an enlarged scale, taken generally along line 9—9 in FIG. 8;

FIG. 10 is a section view taken generally along line 10—10 in FIG. 9;

FIG. 11 is a perspective view of the tray elevator mechanism; and

Figure 12:
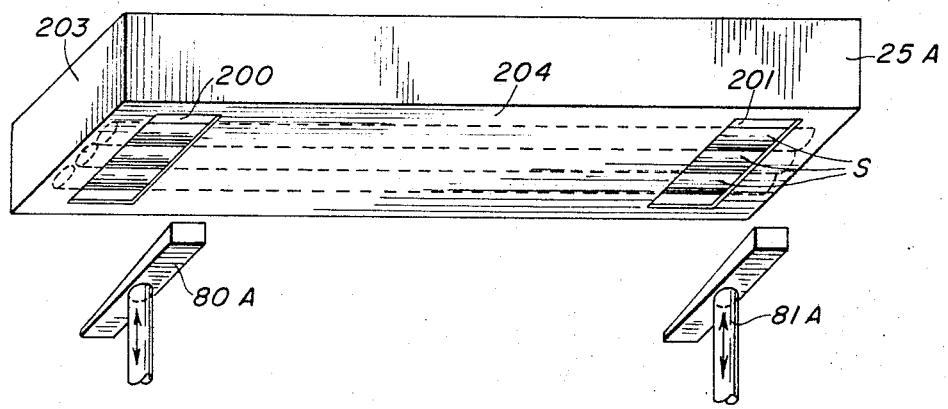
FIG. 12 is a perspective view of certain parts of the order picking mechanism illustrating a modified construction thereof.

While the invention is susceptible of embodiment in many different forms, the drawings illustrate preferred embodiments of the invention. It should be understood that the present disclosure constitutes an exemplification of the principles of the invention and does not limit the invention to the illustrated mechanisms. The scope of the invention is pointed out in the appended claims.

Description of the preferred embodiments

The order picking mechanism 8 is shown generally in FIGS. 1 and 2. It includes a frame with a series of supporting legs 10 and 11 (FIG. 2) extending along the front and rear of the mechanism. Legs 10 and 11 support a platform 12 having tray advancing means including a first central set of lead-in rollers 15 and a second central set of rollers 16. As seen in FIG. 1, each set of rollers is in triplicate, so that the central sets are disposed between corresponding side sets of rollers 15a and 16a and 15b and 16b.

It is the function of the rollers 15, 15a, 15b and 16, 16a, 16b to advance a tray containing stock pieces to a tray unloading station, indicated generally at 20, where a desired number of stock pieces can be discharged onto a table. At table 21, an operator can perform further operations in assembling an order of bars, tubes or other stock items. After the operations are completed with a particular tray, the tray is lowered to a level below table 21 and is deposited on a downwardly-inclined gravity discharge conveyor 22. Conveyor 22 is supported on the frame beneath the tray advancing conveyor comprising rollers 15, 16. The discharge conveyor 22 includes a series of rollers 23 arranged to permit travel of the tray as caused by gravity.

A series of trays is shown in FIG. 2, with a first tray 25 located at unloading station 20, a second tray 26 on rollers 16 in position to advance to the unloading station, and two additional trays 27 and 28 on rollers 15 awaiting advancement to the unloading station. These trays can be loaded on platform 12 by any suitable mechanism, such as a crane or lift truck. In this embodiment of the invention, the trays are open-ended, with the stock pieces S having their ends extending beyond the ends of the tray, as shown particularly in FIG. 1. The trays can have closed or partially closed ends with parts shaped to extend beyond the ends, as described hereinafter in connection with FIG. 12. A tray 29 that has previously been at unloading station 20 is shown on the discharge conveyor 22.

The tray-advancing conveyor roller sets 15 and 16 and their associated roller sets are independently driven. Rollers 15 are driven by a motor 30, as shown in FIG. 6. Motor 30, through a chain 31, drives a sprocket shaft 32 which in turn drives an output chain 33. Chain 33 extends upwardly to engage a sprocket 34 on a shaft 39 of one of the conveyor rollers 15. This same shaft 39 also has a sprocket for driving a chain 35 connected to a sprocket on each of the shafts for several additional conveyor rollers 15. A connecting chain 36 drives another chain 37 through connecting sprockets for driving the remaining group of conveyor rollers 15.

The rollers 16 are driven by means of a motor 44 driving a chain 45 that engages a sprocket 46. Sprocket 46 is connected on a shaft having an output sprocket driving a chain 47 extending upwardly to a shaft 48 having a sprocket and mounting one of the rollers 16. The shaft 48 has a sprocket which drives a chain 49 passing about sprockets on each of the conveyor roller shafts for the conveyor rollers 16. The conveyor rollers 15a, 15b, 16a and 16b are driven from the drives for the rollers 15 and 16 by connections 40, 41, 42 and 43, respectively, shown in FIG. 1, which extend between the roller sets to afford a rotatable drive connection.

With the two independent drive trains, a tray placed on the lead-in section of the first set of conveyor rollers 15 will be advanced by operation of motor 30, to the position shown for tray 27 in FIG. 2. If the final station is open, motor 44 can be energized at the same time as motor 30, in which case the tray is advanced to the position shown for tray 26 in FIG. 2. If the tray is to advance to unloading station 20, conveyor rollers 16 are maintained in operation. The movement of the tray into the unloading station is assisted by a further conveyor mechanism associated with an elevator, to be described.

Unloading station 20 has an elevator mechanism, shown in FIGS. 1, 2 and 11, which embodies two parallel series of rollers 50 and 51 supported by a frame F for up and down movement between the extreme positions shown in FIGS. 2 and 5. Rollers 50 and 51 are generally aligned with the tray-advancing conveyor to receive a tray as advanced by the conveyor rollers 16, 16a and 16b. Rollers 50 and 51 are driven by a drive train, shown in FIG. 7, including a reversible motor 52 that drives a sprocket shaft 53 having sprockets thereon with an output chain 54. Chain 54 drives a sprocket 55 on the shaft of one of the rollers 51; another sprocket on the same roller shaft drives a chain 56 passing about sprockets on the remaining roller shafts, as shown in FIG. 7.

Motor 52 is controlled independently of the motors 30 and 44 for the advancing conveyor rollers. When a tray is to be advanced to the position of tray 25, as shown in FIG. 2, and with the elevator in raised position, motor 52 is energized, along with motor 44. The rollers 16 and 50 and 51 combine to advance the tray to the position of tray 25. A brake is included in the drive for rollers 50 and 51 to assure accurate stop positioning of the tray when the motor 52 is de-energized. The drive from rollers 51 to rollers 50 is through a drive connection 57, shown in FIG. 1. The reversible drive for the rollers 50 and 51 makes it possible to move a tray from the elevator, when the elevator is in its lowered position, onto the rollers 23 of discharge conveyor 22, as shown in FIG. 5.

The elevator mechanism (FIG. 11) generally is of the type offered by American Manufacturing Company, Inc., of Tacoma, Wash., as their Model M–1223 Scissor Lift. The top frame F of the elevator is supported on a base 60 by a pair of scissor linkages, one at each side of the frame, with one pair having arms 61 and 62 pivotally interconnected at 63. The extent of elevation of frame F is determined by the extension of a piston rod 64 from a cylinder 65 connected to arms 66 extending downwardly from the frame F. There is an actuating mechanism and associated structure at each end of the frame F. When the elevator is at its upper position, the rods 64 are substantially extended from the cylinders. The elevator frame F can be lowered to different positions, determined by the amount the rods move into the cylinders, under control of a suitable hydraulic circuit (not shown) for the cylinders. The circuit, when closed, maintains the cylinders and extended piston rods at any desired level.

The handling table 21 is located at the side of the tray unloading station 20 opposite the tray-advancing conveyor. Thus, when one or more stock pieces are removed from a tray they can be readily positioned on table 21. This table may be of generally conventional construction, having supporting legs 70 and 71 (FIG. 2) positioned at various points along the length thereof. Table 21 has a central recess 72 as well as recesses 73 at opposite ends thereof (FIG. 1) to permit access, by an operator, to a position close to a tray in the unloading station and to stock supported on the table.

Means are provided to discharge stock pieces from a tray located at the unloading station as, for example, tray 25 in FIG. 2. The discharge means comprises a pair of stripper arms 80 and 81 spaced apart to lie adjacent opposite ends of a tray positioned in the unloading station. The stripper arms are located beneath lengths of stock extending beyond the ends of the tray, as shown particularly in FIG. 1. Each of these arms is mounted for up and down movement on a carriage 82. Carriage 82 mounts upper and lower sets of guide rollers 83 and 84 (FIG. 8) travelling between a spaced-apart pair of the frame legs 71 and inwardly positioned guide plates 85 fastened to the legs, as shown particularly in FIG. 9. Additional guiding is obtained by guide rollers 87 riding on vertical faces of the legs 71. Guide rollers 87 are mounted on carriage 82 by bolts 88 extending through ears 89 on the carriage. With the confined guide rollers 83, 84 and 87, each of the carriages 82 is guided for up and down movement.

The actuating mechanism for stripper arms 80 and 81 comprises a selectively operable motor 90 which drives a gear reduction unit 91 (FIG. 8) having an output shaft driving a chain 92. Chain 92 drives a sprocket on a jack shaft 93 used to afford a further gear reduction. The jack shaft drives, through a pair of chains 94 and 95, a shaft 96 extending lengthwise of the frame for table 21 and rotatably mounted therein. Shaft 96 is made up of a series of shaft sections connected by couplings 97. The shaft 96 has a pair of sprockets 98 and 99 overlying the carriages for the strippers 80 and 81. Strippers 80 and 81 are connected to two chains 100 and 101, respectively, as shown in FIG. 8. Chains 100 and 101 extend downwardly about a pair of lower sprockets 102, one of which is shown in FIGS. 2 and 9. Sprockets 102 are rotatably mounted on the table frame. Each of the chains 100 and 101 is pinned to its respective stripper arm carriage. This connection is shown for stripper arm 80 in FIG. 9; a pin 103 connects the chain 100 to a pair of ears 104 extending rearwardly from the carriage 82.

Motor 90 is reversible, providing for either up on down movement of stripper arms 80 and 81. As shown in FIGS. 2–4, the upper edges of the stripper arms have blocks 105 providing an inclined plane, inclined downwardly towards the work table 21.

The operation of the mechanism can now be described. The operation in advancing a tray to unloading station 20 has previously been referred to and can now be further described with respect to operation at the unloading station. This operation is shown in sequence in FIGS. 2 to 5.

Initially, the elevator frame F is in its upper position and has received a tray 25. The stripper arms 80 and 81 are in a lowered position. The operator then actuates the cylinders 65 for the elevator frame F to lower the elevator to the position shown in FIG. 3, in which the top of tray 25 is slightly beneath the upper surface of the work table 21. The stripper arms are still in lowered position. The operator then energizes motor 90 to elevate stripper arms 80 and 81 to the position shown in FIG. 4, the stock pieces S being lifted out of the tray 25. Due to the inclined blocks 105 on the tops of the stripper arms, the stock pieces tend to roll toward work table 21.

The operator can control the height of stripper arms 80 and 81 to determine the amount of stock permitted to roll onto the work table. This element of control by the operator also takes into account the total height of material that is in the tray. If the tray is substantially full and only a few pieces are required to fill an order, then the stripper arms are not elevated as far as when the tray is relatively empty.

After this operation, shown in FIG. 4, the next step is the position shown in FIG. 5, in which stripper arms 80 and 81 have been lowered and the elevator frame F has also been lowered. The drive motor 52 for conveyor rollers 50 and 51 on the elevator then can be operated in a direction to cause the tray 25 to move onto the discharging conveyor rollers 23. The operation can then be repeated by moving the elevator back to the position shown in FIG. 2. The motor 44 for the rollers 16 and the motor 52 for the rollers 50 and 51 are actuated to advance the next tray 26 into the position on the elevator previously occupied by the tray 25. The operation is then repeated, under the control of the operator.

As an optional feature, the weight of the stock pieces selected by an operator can be checked by means of a weighing mechanism 125 located at the side of the table 21 opposite the tray unloading station (FIG. 2). This mechanism includes a scale 126 supported on the floor and having upstanding side frame members 127 and 128 which mount vertically extending rollers 129 and 130, respectively. Rollers 129 and 130 define spaced guides between which stock pieces can be positioned when moved off of the table 21. These guides terminate at approximately the same level as the top of work table 21. A stock supporting platform is defined by a series of rollers 131 carried by a frame 132. The frame 132 is mounted for up and down movement by a series of worm jacks 133 arranged at the four corners of the frame 132. Jacks 133 are actuated by rotatable jack members 134 operated by a motor 135 supported on the base 126. This construction permits easy entry of stock pieces into weight-checking mechanism. All of this mechanism is included in the tare of the scale, so that an accurate weight can be obtained. With the movable mechanism, rollers 131 can be positioned near the top of the guides to receive a load without dropping it. As the load may build up, rollers 131 can be lowered by lowering of the worm jacks 133.

From the foregoing description, it will be seen that the order picking mechanism 8 permits an operator to remove the bars or other stock S from the trays such as trays 25–29 without substantial manual effort, despite the fact that the stock pieces may comprise steel bars, tubes, rods, or other members of substantial weight and length. The first conveyor means of the invention, constituting the conveyor rollers 15, 16 and 50, is effective to advance the stock trays, in succession, depositing the trays on the elevator while the elevator is positioned at a first level as shown in FIG. 2. No manual effort is required on the part of the operator in performing this operation.

The retractable lifting means comprising the stripper arms 80 and 81 lifts the stock from the tray while the tray is positioned on the elevator, again without manual effort on the part of the operator. In the embodiment of FIGS. 1–11, this operation is performed while the elevator is at a reduced level in comparison with its initial tray-receiving level, as can be seen by comparing FIGS. 2 and 3. However, the tray-unloading level for the elevator could be the same as the tray-receiving level; it will be seen that this can be accomplished merely by lowering the first or input conveyor to a level corresponding to that of the tray 25 in FIG. 3. Indeed, unloading could be accomplished at the second fixed level for the elevator, the discharge level aligned with the second conveyor of the mechanism. Regardless of the level used for unloading, the tray being unloaded, such as tray 25 in FIG. 3, should have its upper side edge positioned at or just below the level of the support means (table 21) to which the stock is removed.

As noted above, the sloped upper surfaces 105 of the stripper arms are inclined downwardly toward the table or support means 21 so that the stock, when lifted, has a tendency to move toward the table under the influence of gravity. Consequently, the effort required of the operator in moving a selected number of stock pieces S to table 21 is minimal. Furthermore, the effort required on the part of the operator to shift the stock to weighing platform 131 is not excessive, so that substantially all of the operations are performed by the order picking mechanism with a minimum of operator effort but with all operations under the direct control of the operator.

FIG. 12 illustrates a modification of the order picking mechanism 8 that may be utilized where the stock pieces S are stored in trays having closed ends. A tray 25A of this kind is illustrated in FIG. 12, the ends 203 of the tray being closed. Where such closed-end trays are employed, each tray is provided with spaced apertures 200 and 201 in the bottom 204 of the tray. Apertures 200 and 201 should be located near the ends of the tray but the spacing between the apertures should be less than the length of the stock pieces S stored in the tray.

In the modification of the invention illustrated in FIG. 12, the order picking mechanism remains unchanged except for the alignment, relative to the tray, of two stripper arms 80A and 81A corresponding to the arms 80 and 81 described above. The stripper arms 80A and 81A are disposed on a center-to-center spacing that corresponds to the center-to-center spacing between apertures 200 and 201. The lifting heads on the stripper arms are made narrower than the apertures 200 and 201 so that the arms can project through the apertures even though the tray 25A may be misaligned to some extent with the stripper arms. The overall operation of the order picking mechanism with this modification is essentially the same as described above and need not be repeated.

I claim:
1. An order picking mechanism for stock such as bars, tubes, rods and the like stored in stock trays by size or other characteristic, comprising:
   a tray unloading station including an elevator and means for moving said elevator between a plurality of different levels;
   first conveyor means for advancing stock trays, in succession, to deposit said trays on said elevator while said elevator is positioned at a first level;
   retractable lifting means, located at said unloading station, for lifting the stock from a tray positioned on said elevator, while the elevator is at a given level, through an adjustable distance to position at least part of the stock above the side of the tray to enable ready removal of one or more pieces of stock from the tray;
   support means, located immediately adjacent said unloading station, for receiving and supporting stock removed from a tray at said unloading station;
   and second conveyor means, aligned with a second level for said elevator, for transporting trays away from said unloading station when said elevator is at said second level.

2. An order picking mechanism according to claim 1 in which said lifting means comprises a pair of vertically movable stripper arms located adjacent opposite ends of the trays as positioned at said unloading station, and means for moving said stripper arms upwardly by varying amounts to compensate for differences in the quantity of stock in different trays.

3. An order picking mechanism according to claim 2 in which said stripper arms are spaced from each other by a distance greater than the length of a tray for engaging projecting ends of stock stored in open ended trays.

4. An order picking mechanism according to claim 2 in which said stripper arms are spaced from each other by a distance less than the length of a tray for engaging the stock in trays having correspondingly spaced apertures in the bottoms thereof for receiving said arms.

5. An order picking mechanism according to claim 2 in which each of said arms has a sloped upper surface inclined downwardly toward said support means to cause stock lifted from the tray to tend to move toward said support means by gravity.

6. An order picking mechanism according to claim 1 in which said first conveyor means comprises at least two independently driven conveyor units, for advancing the trays toward a position adjacent the unloading station, and a reversible conveyor unit mounted on said elevator for advancing the trays to final unloading position, said reversible conveyor unit further comprising an initial conveyor unit in said second conveyor means.

7. An order picking mechanism according to claim 1 and further including means for weighing a stock order comprising:
   a scale base;
   spaced guides on said base having their upper ends at approximately the same level as said support means, for receiving stock by lateral movement from said support means;
   a platform, between said guides, for supporting the stock as removed from said support means;
   and adjusting means for adjusting the height of said platform relative to said guides to accommodate orders of varying size.

References Cited

UNITED STATES PATENTS 3,269,565　8/1966　Kemp _____ 214—2

HUGO O. SCHULZ, *Primary Examiner.*

U.S. Cl. X.R.

214—309, 315